US009064266B2

(12) United States Patent
Donnelly

(10) Patent No.: US 9,064,266 B2
(45) Date of Patent: Jun. 23, 2015

(54) METHOD AND SYSTEM FOR COMPILING COMPETITIVE ADVERTISER AND KEYWORD INFORMATION FOR SEARCH ENGINE ADVERTISERS

(75) Inventor: Hylton Donnelly, Redbourn (GB)

(73) Assignee: Adthena Ltd, London (GB)

( * ) Notice: Subject to any disclaimer, the term of this patent is extended or adjusted under 35 U.S.C. 154(b) by 131 days.

(21) Appl. No.: 13/697,226

(22) PCT Filed: May 13, 2011

(86) PCT No.: PCT/AU2011/000562
§ 371 (c)(1),
(2), (4) Date: Nov. 9, 2012

(87) PCT Pub. No.: WO2011/140609
PCT Pub. Date: Nov. 17, 2011

(65) Prior Publication Data
US 2013/0054556 A1    Feb. 28, 2013

(30) Foreign Application Priority Data

May 13, 2010   (AU) ................................ 2010902033

(51) Int. Cl.
*G06F 17/30*  (2006.01)
*G06Q 30/02* (2012.01)

(52) U.S. Cl.
CPC .......... *G06Q 30/02* (2013.01); *G06F 17/30864* (2013.01)

(58) Field of Classification Search
CPC .................................................... G06F 17/30
See application file for complete search history.

(56) References Cited

U.S. PATENT DOCUMENTS

| | | | | |
|---|---|---|---|---|
| 2005/0075995 | A1* | 4/2005 | Stewart et al. | 706/52 |
| 2008/0221989 | A1* | 9/2008 | Messer et al. | 705/14 |
| 2008/0262723 | A1* | 10/2008 | Wuersch et al. | 701/210 |
| 2010/0174710 | A1* | 7/2010 | Carson et al. | 707/728 |
| 2014/0108376 | A1* | 4/2014 | Batali et al. | 707/708 |

OTHER PUBLICATIONS

International Search Report dated Jun. 24, 2011, for PCT/AU2011/000562.
http://blog.keywordcompetitor.com/2009_08_01_archive.html, dated Aug. 31, 2009.

(Continued)

*Primary Examiner* — Etienne Leroux
*Assistant Examiner* — Farhad Agharahimi
(74) *Attorney, Agent, or Firm* — Buchanan Nipper

(57) ABSTRACT

The present invention relates to a computer implemented method of generating a relevant COMPETITORS list in response to a search inquiry, the method comprising a number of steps such as receiving a search inquiry from a client having a client domain having a plurality of client domain keywords; performing a search of a computer network for data satisfying a set of search parameters; obtaining a first set of SERP's, said first set of SERP's containing a list of competitors domains and associated competitors domain keywords. This date then forms the basis of further calculations of "Inwards Overlap" and "Outwards Overlap" to then calculate a competitor relevance score being the higher of the Inwards Overlap (as a percentage), and the Outwards Overlap (as a percentage).

10 Claims, 1 Drawing Sheet

(56) References Cited

OTHER PUBLICATIONS http://faq.keywordcompetitor.com/ [retrieved from http://web.archive.org/web/20090907012006/http://faq.keywordcompetitor.com/, captured Sep. 7, 2009 as per Wayback Engine], dated Aug. 6, 2009.
http://keywordcompetitor.com/CompetitorMonitoringTool.aspx [retrieved from http://web.archive.org/web/20100101225218/http://keywordcompetitor.com/CompetitorMonitoringTool.aspx], published on Jan. 1, 2010 as per Wayback Engine.
http://keywordcompetitor.com/ KeywordResearchTool.aspx [retreived from http://web.archive.org/web/20100101224610/http://keywordcompetitor.com/KeywordResearchTool.aspx], published on Jan. 1, 2010 as per Wayback Engine.
http://keywordspypro.com/ [retrieved from http://web.archive.org/web/20081219093035/http://keywordspypro.com/], published on Dec. 19, 2008 as per Wayback Engine.
http://www.keywordspypro.com/signup.aspx [retrieved from http://web.archive.org/web/20081217080233/http://www.keywordspypro.com/signup.aspx], published on Dec. 17, 2008 as per Wayback Engine.
Written Opinion dated Jun. 24, 2011, for PCT/AU2011/000562.

* cited by examiner

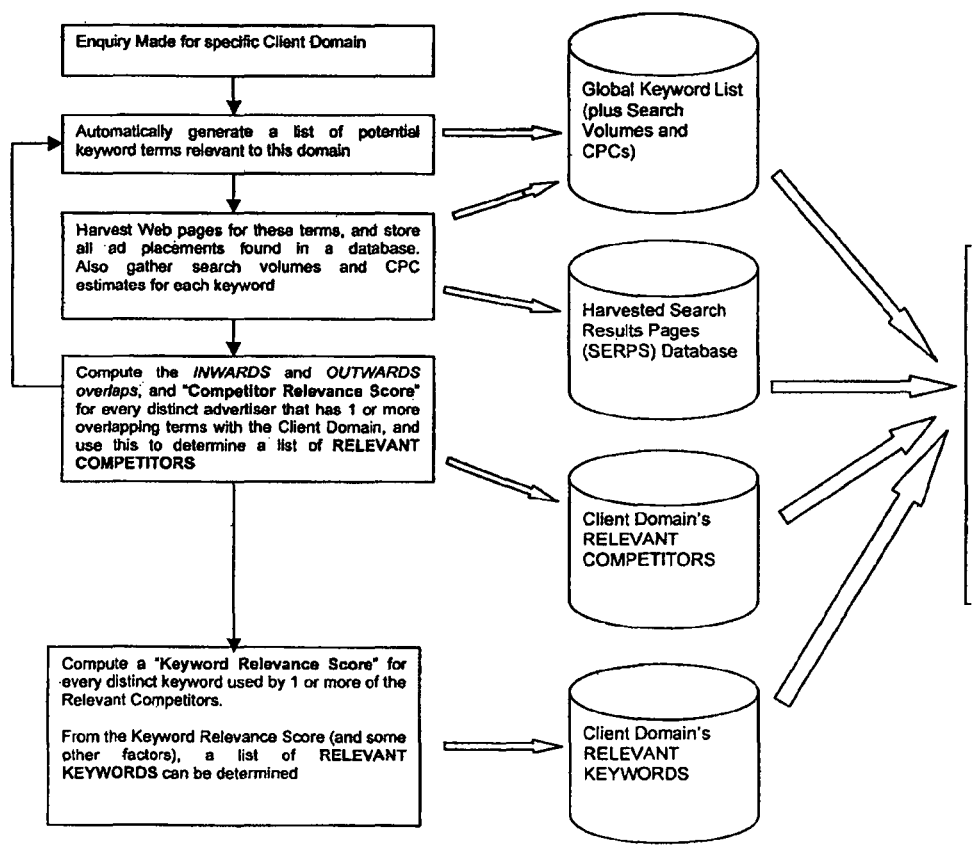

METHOD AND SYSTEM FOR COMPILING COMPETITIVE ADVERTISER AND KEYWORD INFORMATION FOR SEARCH ENGINE ADVERTISERS

FIELD OF THE INVENTION

This invention relates to keyword searching and ranking of information/data.

There are many search engines currently in use that aim to provide a set of results or set of data specific to user's needs or parameters. Search engines allow persons to search and display web pages of interest in accordance with a defined set of keywords or keyword combinations. Search engines typically provide 2 types of results listings—natural listings, and sponsored (paid) listings.

To generate natural listings, search engines "crawl" the web, harvesting web pages and storing these in massive databases. When users make an enquiry the search engine scans it's database for pages that contain the same keywords or keyword combinations, and ranks the harvested pages according to a specific set of relevancy algorithms or user requirements.

An example of this is the Google search engine in which the search engine calculates a relevance score that tries to determine how close the harvested pages is to the users requirements (Google PageRank). The results are then displayed to the user in an order based on the calculated score.

The activity of optimising a web-site's web-pages in order to increase the likelihood that a search engine ranks those pages highly within its natural results listings is called Search Engine Optimisation, or SEO. In the field of SEO competition for certain keywords is fierce and good performance on certain keywords may dramatically affect a company's market position.

Companies advertising their goods/services via a search engine's Sponsored Listings typically select a set of keywords relevant to their product/service and set a budget in relation to those keywords and then determine the price for each selected keyword. When a company's ad is displayed the company pays the search engine when a potential consumer clicks on the ad. Search engines conduct auctions based on the bids received by competitors on certain keywords. This then determines both the position and placement of the ads on search results page. Keywords then become a valuable commodity. This activity is called PPC (pay-per-click) advertising.

It is often desirable for some companies to determine the keywords that their competitors consider important so as to help shape their marketing strategy and in some cases also help to determine those companies that are operating in the same keyword space that may in fact be unidentified competitors.

What we have now invented is an automated process and associated methodologies to provide effective identification of relevant competitors and relevant keywords for any specific Client Domain, by harvesting and analysing listings within Search Engine Results Pages (SERPS) that provides advantages over what is presently known allowing the provision of automatic identification of relevant competitors and keywords; automatic monitoring and reporting on competitor activity; automatic calculation and monitoring of competitors' share of voice within the set of relevant keywords; benchmarking and other purposes; assistance in campaign improvement, through identification of missing or poor performing relevant keywords for that domain.

OBJECT OF THE INVENTION

It is an object of the present invention to provide a process and methodologies for effective identification of Relevant Competitors and Relevant Keywords that will substantially overcome the drawbacks of the currently known methods.

Other objects and advantages of the present invention will become apparent from the following description, taking in connection with the accompanying drawings, wherein, by way of illustration and example, an embodiment of the present invention is disclosed.

SUMMARY OF THE INVENTION

The term "keyword" may include one or more terms that can be used as part of a query and may encompass more than a single word, or a phrase.

The term "relevant keyword" refers to any keyword which is likely to be useful in generating traffic for the Client Domain, and which therefore should be considered in any monitoring or reporting of their search engine marketing performance.

The term "SERP" refers to Search Engine Results Pages.

The term "relevant competitor" refers to any advertiser which a client domain would consider competes with them in the real world, and which it would therefore expect to see considered in any monitoring or reporting of their search engine marketing performance.

The term "Competitor Relevance Score", refers to the higher of the Inwards Overlap (as a percentage), and the Outwards Overlap (as a percentage), so that users can rank the relevant competitors found, and review Competitors with a low score.

According to the present invention, although this should not be seen as limiting the invention in any way, there is provided a computer implemented method of generating a relevant COMPETITORS list in response to a search inquiry, the method comprising the steps of:

receiving a search inquiry from a client having a client domain having a plurality of client domain keywords;

performing a search of a computer network for data satisfying a set of search parameters;

obtaining a first set of SERP's, said first set of SERP's containing a list of competitors domains and associated competitors domain keywords;

calculating an "Inwards Overlap" being the proportion of the client domain keywords that feature in the competitors domain keywords;

calculating an "Outwards Overlap" being the proportion of the competitors domain keywords that feature in the client domain keywords;

calculating a competitor relevance score being the higher of the Inwards Overlap (as a percentage), and the Outwards Overlap (as a percentage);

ranking the competitors domains based on the competitor relevance score.

In preference, the set of keywords is limited to sponsored listings.

In preference, the set of keywords is limited to natural listings.

In preference, the method further includes a minimum competitor relevance score as set by a user, wherein any competitor relevance score being less than the minimum competitor relevance results in the competitor being determined a non-relevant competitor.

According to the present invention, although this should not be seen as limiting the invention in any way, there is also provided a computer implemented method of generating a relevant KEYWORDS list in response to a search inquiry, the method comprising the steps of:

Compiling a database of associated competitors domain keywords from the SERP's;

Determining which competitors use which keywords present in the database of associated competitors domain keywords;

Calculate a keyword relevance score based on at least one of the following:

The number of relevant competitors using a selected keyword;

Outwards overlap against each competitor using the keywords;

Number of competitors (relevant or non-relevant) using the keywords;

Determine a list of relevant keywords from the database of associated competitors domain keywords, based on the keyword relevance score.

In preference, usage of a keyword by an associated competitor is considered as a vote that the keyword is also relevant to the Client Domain In preference, each vote has a credibility score=(Outward Overlap)$^3$.

In preference, multiple votes for the same keyword used by a number of associated competitors can be combined to give a Combined Credibility vote using the formula:

Combined Credibility of $n$ votes=$1-(1-V1)*(1-V2)* \ldots *(1-Vn)$

In preference, the Combined Credibility of n votes=Keyword Relevance Score.

BRIEF DESCRIPTION OF THE DRAWINGS

In order to understand the invention and to see how it may be carried out in practice, an embodiment will now be described, by way of a non-limiting example only, with reference to the accompanying drawing in which:

BRIEF DESCRIPTION OF THE INVENTION

By way of example, an embodiment, which is a non-limiting example, of the invention is described more fully hereinafter with reference to the accompanying drawings, in which:

FIG. 1 shows an schematic overview of the present invention.

If an Advertiser appears within the SERPs on a particular keyword, and the Client Domain also appears within the SERPS for that same keyword, then that Advertiser and the Client Domain can be considered to be competing for traffic on that particular keyword.

However, advertising for traffic on the same keyword does not automatically mean that the Advertisers in question are necessarily "competitors" in the normal sense of the word, as they may be offering completely different services.

For example, one advertiser on the keyword phrase "Paris France" may be offering hotel bookings in Paris; whilst a second could be offering flights to Paris; and a third offering tickets to the Rugby World Cup finals in Paris France. So, whilst the hotel, airline and rugby association sites are all advertising on this same keyword, they are in fact not "real world" competitors.

Fortunately the situation does become clearer when considering multiple keywords. Advertisers typically appear in the SERPS for thousands, or even tens of thousands of keywords, which we will call each Advertiser's "Keyword Set". If a particular advertiser is found to be competing for traffic on a large number of the same keywords as the Client Domain, then it is likely that that advertiser is offering similar products and services as the Client Domain, and is in fact a "Competitor" in the normal sense of the word.

Referring again to the example above:

hotel sites are likely to appear on hundreds of hotel name keywords in common with other hotel sites;

flights websites are likely to have thousands of flights related keywords in common with each other, and the rugby association site is not likely to have any of the above keywords in common with the other sites.

When considering the overlap between each Advertiser's Keyword Set, and the Client Domain's own Keyword Set, it is useful to consider both the:

"Inwards Overlap"—being the proportion of the Client Domain's keywords that are also within the other advertiser's Keyword Set; and "Outwards Overlap"—being the proportion of the other advertisers keywords that are used by the Client Domain, and so within the Client Domain's Keyword Set Advertisers can be divided into the following 4 categories:

Direct Competitor, Super Competitor, Niche Competitor and Non Competitor

|  | Outwards Overlap: HIGH | Outwards Overlap: LOW |
|---|---|---|
| Inwards Overlap: HIGH | DIRECT COMPETITOR: The other advertiser has most (or all) of the Client Domain's keywords, and the Client Domain has most (or all) of the other advertiser's keywords. This means the other advertiser and the Client Domain have very similar Keyword Sets. Both the Client Domain and the other Advertiser are DIRECT COMPETITORS of each other. | SUPER COMPETITOR: The other advertiser has most (or all) of the Client Domain's keywords, but the Client Domain only has a small proportion of the other advertiser's keywords. This means the other advertiser has many more keywords than the Client Domain, and whilst offering most (or all) of the products and services of the Client Domain, it also offers many more products. The other advertiser is a SUPER COMPETITOR of the Client Domain, whilst the Client Domain is a NICHE COMPETITOR of the |

|  | Outwards Overlap: HIGH | Outwards Overlap: LOW |
| --- | --- | --- |
| Inwards Overlap: LOW | NICHE COMPETITOR: The Client Domain has most (or all) of the other advertiser's keywords, but the other advertiser only has a small proportion of the Client Domain's keywords. This means the Client Domain has many more keywords than the other advertisers, and whilst offering most (or all) of the products and services of the other advertiser, it also offers many more products. The other advertiser is a NICHE COMPETITOR of the Client Domain, whilst the Client Domain is a SUPER COMPETITOR of the other advertiser. | other advertiser. NON COMPETITOR: The Client Domain has only a few (or none) of the other advertiser's keywords, and the other advertiser has only a few (or none) of the Client Domain's keywords. This means the other advertiser and the Client Domain have very different Keyword Sets. Whilst there might be some keywords in common, it is likely that they are offering different products and services on these few keywords. Even if they are offering the same products and services, the very small overlap in their business models means they are not likely to consider each other as relevant competitors. |

In order to implement a minimum Competitor Relevance Score, below which any advertiser is considered not to be a Relevant Competitor, and thereafter automatically excluded from any reporting or monitoring performed by the system Allow users to override the automatic status assignment for some advertisers, and rather manually specify those advertisers as "Relevant Competitors" or "Non-Competitors" regardless of their computed score.

Allow users to specify a set of "Known Relevant Terms" to be deemed to be included in the Client Domain's Keyword Set when determining overlap with other advertisers Keyword Sets, regardless of whether the Client Domain has actually appeared on these terms in the SERPS. This is useful when a Client Domain has not yet appeared in any SERPS pages, but still wishes to start monitoring their competitive landscape.

Keep a record of each Advertiser's Outwards Overlap to assist in derivation of Relevant Keywords—see below.

In some circumstances, it may also be useful to:

Limit the determination of Keyword Sets to only Sponsored Listings or Natural Listings.

Consider the sum of the traffic available on the overlapping terms between each advertiser and the Client Domain (called the Competed Clicks) in determining the Competitor Relevance Score. The higher the number of Competed Clicks, the more likely that an advertiser is a relevant competitor. Put another way, an advertiser competing on only a small number of high traffic terms is perhaps more likely to be considered a competitor than another advertiser competing on a large number of very low traffic terms.

Formula

Competitor Relevance Score=higher of the "Inwards Overlap (as a percentage)" and the "Outwards Overlap" (as a percentage)

Part 2

Relevant Keywords

What is a relevant Keyword?

A relevant Keyword is any keyword which is likely to be useful in generating traffic for the Client Domain, and which therefore should be considered in any monitoring or reporting of their search engine marketing performance.

In order to reliably identify Relevant Keywords based on SERPS listings, one needs to be able to Implement a process to continually grow the keyword database, gathering more and more keywords which are at least likely to be relevant. Ideally this should be automated.

Harvest the SERPS pages for these keywords, recording which keywords each advertiser uses (the Advertiser's Keyword Set), and conversely which advertisers appear on each keyword;

And then crucially, implementing a methodology and process to extract from this raw data, the set of keywords which are in fact relevant to the Client Domain Step 3: Determining Relevant Keywords Relevant Keywords are derived from the keyword sets of the Relevant Competitors. Importantly, not all the keywords of relevant competitors are necessarily relevant to the Client Domain, as some Relevant Competitors may offer additional products and services which are not offered by the Client Domain.

Determining Relevant Keywords is a 2 step process.

First compute a "Keyword Relevance Score"

Then select Relevant Keywords based on the Keyword Relevance Score, and other factors.

The key indicators useful in determining the raw Keyword Relevance Score are:

A. The number of Relevant Competitors using the keyword (more competitors using the term gives us more confidence)

B. Outwards Overlap against each Competitor using that keyword (higher outwards overlap suggests the terms come from a more highly correlated keyword set)

Number of competitors using the keyword: The higher the number of Relevant Competitors using a keyword, the more likely it is that the keyword is relevant to the Client Domain.

Outwards overlap: "Outwards Overlap" is important when:

We expect that any keyword used by a Direct Competitor (these have a HIGH outwards overlap) is very likely to be highly relevant keyword for the Client Domain too, since there is already such a high correlation between the Keyword Sets.

Similarly, if a Niche Competitor (also having a HIGH outwards overlap) has a keyword which the Client Domain does not have, then it too is likely to be relevant to the Client Domain. This is because the Client Domain already has most of that advertiser's other keywords, and we believe the other advertiser is most likely offering a subset of the Client Domain's own products and services. Any additional keywords they are appearing on are therefore also likely to be relevant to the Client Domain too.

In contrast to this, Super Competitors (which have a LOW outwards overlap) will have many keywords which the Client Domain does not have, and there is a good chance these keywords may relate to products and services which the Client Domain does not offer, and (although they may be) these are not necessarily Relevant Keywords.

Looking at the above, it can be seen that the "Outwards Overlap" calculated for each Relevant Competitor can be usefully used as a measure of confidence that each Competitor's keyword may be relevant to the Client Domain.

Stated another way, the "Outwards Overlap" reflects the Competitor's credibility when it comes to suggesting relevant keywords for the Client Domain, or the probability that its own keywords are likely to be relevant to the Client Domain.

Keyword Relevance Score

The presence of a keyword in each Relevant Competitor's Keyword Set can then been seen as an independent "vote" that that keyword is also a Relevant Keyword for the Client Domain, and further to consider that the credibility of each vote (which might also be described as the probability of the vote being correct) can be based on the "Outwards Overlap" (0%-100%) of the voter (i.e. the Competitor).

A person skilled in the art would then understand this and be able to make use of alternative ways to capture these factors without necessarily deviating from the scope of the invention When translating the "Outwards Overlap" of Competitor A into a measure of credibility (or assumed probability that each of Competitor A's keywords are equally relevant to the Client Domain), by using the cube (the third power of a number) of the Outwards Overlap gives results.

Credibility (probability keyword is relevant)=(Outward Overlap)$^3$

This translates into real world examples as follows:

If the Client Domain already shares 9,999 of 10,000 keywords used by a competitor (99.99% Outwards Overlap), then we are assuming that there is a 0.9999$^3$=99.97% probability that the remaining keyword is also relevant to the Client Domain.

If the Client Domain already shares only 5,000 of 10,000 keywords used by a competitor (50% Outwards Overlap), then we are assuming that there is only a 0.5$^3$=12.5% probability that each of the other 5000 keywords are also relevant to the Client Domain. Without additional "votes" from other competitors, these keywords are unlikely to pass the threshold to be considered relevant.

The next consideration is how to combine multiple "votes" from 2 or more different Competitors for the same keyword.

Again, the person skilled in the art would understand that they could apply this in a number of ways without deviating from the scope of the invention; the concept is that each vote removes a portion of the remaining uncertainty left after considering the earlier votes. And that the amount of uncertainty removed by each vote is based on the credibility of that vote.

For example, a vote for Keyword K1 by Competitor A with credibility 40% would mean we are 40% certain that the keyword K1 is relevant to the Client Domain. The remaining uncertainty is 60%.

A second vote for the same Keyword K1, by a different Competitor B with credibility 50%, would remove 50% of the 60% remaining uncertainty, increasing the overall certainty that K1 is relevant from 40% to 70% overall.

This can be stated as:

$$\begin{aligned}\text{Combined Credibility of 2 votes} &= V1 + (1-V1)*V2 \\ &= V1 + V2 - V1 \cdot V2 \\ &= 1 - (1-V1)*(1-V2)\end{aligned}$$

This formula can be written more generically to consider n votes. If we write Vk for the credibility of Vote k, we have:

Combined Credibility of $n$ votes=1−(1−$V1$)*(1−$V2$)* ... *(1−$Vn$)

This formula is the same as saying $$\begin{aligned}\text{Combined Credibility of } n \text{ votes} = &1 - (\text{Probability Vote 1 is Wrong})* \\ &(\text{Probability Vote 2 is Wrong})* ... * \\ &(Prob \text{ Vote } k \text{ is Wrong})\end{aligned}$$

Which is also the same as saying "1−(probability all the independent voters are wrong)", which is intuitively also correct.

Keyword Relevance Score=Combined Credibility of all Votes for that Keyword

When computing this score within a typical Database application, it is helpful to express the formula using logarithms, so that the formula can be based on an arithmetic SUM (very efficient in database applications) of a variable number of votes, rather than the PRODUCT of a number of different terms.

$$\begin{aligned}\text{Keyword Relevance Score} &= 1 - (1-V1)*(1-V2)* ... *(1-Vn) \\ &= 1 - \exp(\text{SUM}(\log(1-Vk)))\end{aligned}$$

As can now be readily appreciated, the disclosed method allows automation of the above process is very important, as it makes it commercially viable to offer a tool to perform all of the following tasks, with minimal human intervention or set-up that was until this point unknown. This method/process/systems described herein allows for:

Automatic identification of relevant competitors and keywords

Automatic monitoring and reporting on competitor activity

Automatic calculation and monitoring of competitors' share of voice within the set of relevant keywords, for benchmarking and other purposes Assistance in Campaign Improvement, through identification of missing or poor performing relevant keywords for that domain (rather than irrelevant keyword suggestions)

Although the invention has been herein shown and described in what is conceived to be the most practical and preferred embodiment, it is recognized that departures can be made within the scope of the invention, which is not to be limited to the details described herein but it is to be accorded the full scope of the appended claims so as to embrace any and all equivalent devices, methods and apparatus.

Various modifications may be made in details of design and construction [and process steps, parameters of operation etc] without departing from the scope and ambit of the invention.

The invention claimed is:

1. A computer implemented method of generating a list of relevant keywords in response to a search inquiry for a Client Domain, the method comprising the steps of:
   a. compiling a database of associated competitors domain keywords from Search Engine Results Pages (SERP's);
   b. determining which competitors use which keywords present in the database of associated competitors keywords;
   c. calculating an Outwards Overlap value for each competitor domain being the proportion of the competitors domain keywords that feature in the client domain keywords;
   d. calculating a keyword relevance score for each keyword based on the Outwards Overlap against each competitor using the keywords, wherein:
      i. the usage of a keyword by an associated competitor is considered as a vote that the keyword is also relevant in the Client;
      ii. a credibility score equal to the vote is determined based on the Outwards Overlap of the competitor using the keywords;
      iii. a keyword relevance score is determined based on the combined credibility value of all the votes for the keyword; and
   e. determining a list of relevant keywords from the database of associated competitors domain keywords, based on the keyword relevance score.

2. The method of claim 1, wherein multiple votes $V1 \ldots Vn$ for the same keyword used by a number of associated competitors can be combined to give a Combined Credibility vote using the formula:

$$\text{Combined Credibility of } n \text{ votes} = 1-(1-V1)*(1-V2)* \ldots *(1-Vn).$$

3. The method of claim 1, wherein the set of keywords is limited to sponsored listings, wherein the set of keywords is limited to natural listings, and wherein multiple votes for the same keyword used by a number of associated competitors can be combined to give a Combined Credibility vote using the formula:

$$\text{Combined Credibility of } n \text{ votes} = 1-(1-V1)*(1-V2)* \ldots *(1-Vn).$$

4. The method of claim 1, wherein the set of keywords is limited to sponsored listings, wherein the set of keywords is limited to natural listings, and wherein the Combined Credibility of n votes equals a Keyword Relevance Score.

5. A computer implemented method of generating a list of relevant keywords in response to a search inquiry for a Client Domain, the method comprising the steps of:
   a. compiling a database of associated competitors domain keywords from Search Engine Results Pages (SERP's);
   b. determining which competitors use which keywords present in the database of associated competitors keywords;
   c. calculating an Outwards Overlap value for each competitor domain being the proportion of the competitor's domain keywords that feature in the client domain keywords;
   d. calculating a keyword relevance score for each keyword based on the Outwards Overlap against each competitor using the keywords, wherein:
      i. the usage of a keyword by an associated competitor is considered as a vote that the keyword is also relevant in the Client Domain;
      ii. a credibility score equal to the vote is determined based on the Outwards Overlap of the competitor using the keywords;
      iii. a keyword relevance score is determined based on the combined credibility value of all the votes for the keyword; and
   e. determining a list of relevant keywords from the database of associated competitors domain keywords, based on the keyword relevance score;
   wherein the set of keywords is limited to sponsored listings, wherein the set of keywords is limited to natural listings, and wherein multiple votes for the same keyword used by a number of associated competitors can be combined to give a Combined Credibility vote using the formula:

$$\text{Combined Credibility of } n \text{ votes} = 1-(1-V1)*(1-V2)* \ldots *(1-Vn).$$

6. The method of claim 5, wherein multiple votes $V1 \ldots Vn$ for the same keyword used by a number of associated competitors can be combined to give a Combined Credibility vote using the formula:

$$\text{Combined Credibility of } n \text{ votes} = 1-(1-V1)*(1-V2)* \ldots *(1-Vn).$$

7. The method of claim 5, wherein the set of keywords is limited to sponsored listings, wherein the set of keywords is limited to natural listings, and wherein the Combined Credibility of n votes equals a Keyword Relevance Score.

8. A computer implemented method of generating a list of relevant keywords in response to a search inquiry for a Client Domain, the method comprising the steps of:
   a. compiling a database of associated competitors domain keywords from Search Engine Results Pages (SERP's);
   b. determining which competitors use which keywords present in the database of associated competitors keywords;
   c. calculating an Outwards Overlap value for each competitor domain being the proportion of the competitor's domain keywords that feature in the client domain keywords;
   d. calculating a keyword relevance score for each keyword based on the Outwards Overlap against each competitor using the keywords, wherein:
      i. the usage of a keyword by an associated competitor is considered as a vote that the keyword is also relevant in the Client Domain;
      ii. a credibility score equal to the vote is determined based on the Outwards Overlap of the competitor using the keywords;
      iii. a keyword relevance score is determined based on the combined credibility value of all the votes for the keyword; and
   e. determining a list of relevant keywords from the database of associated competitors domain keywords, based on the keyword relevance score;
   wherein multiple votes $V1 \ldots Vn$ for the same keyword used by a number of associated competitors can be combined to give a Combined Credibility vote using the formula:

$$\text{Combined Credibility of } n \text{ votes} = 1-(1-V1)*(1-V2)* \ldots *(1-Vn).$$

9. The method of claim 8, wherein the set of keywords is limited to sponsored listings, wherein the set of keywords is limited to natural listings, and wherein multiple votes for the same keyword used by a number of associated competitors can be combined to give a Combined Credibility vote using the formula:

$$\text{Combined Credibility of } n \text{ votes} = 1-(1-V1)*(1-V2)*\ldots*(1-Vn).$$

10. The method of claim 8, wherein the set of keywords is limited to sponsored listings, wherein the set of keywords is limited to natural listings, and wherein the Combined Credibility of n votes equals a Keyword Relevance Score.

* * * * *